(No Model.) 2 Sheets—Sheet 1.
W. A. E. HENRICI.
BOSOM IRONING MACHINE.
No. 548,876. Patented Oct. 29, 1895.
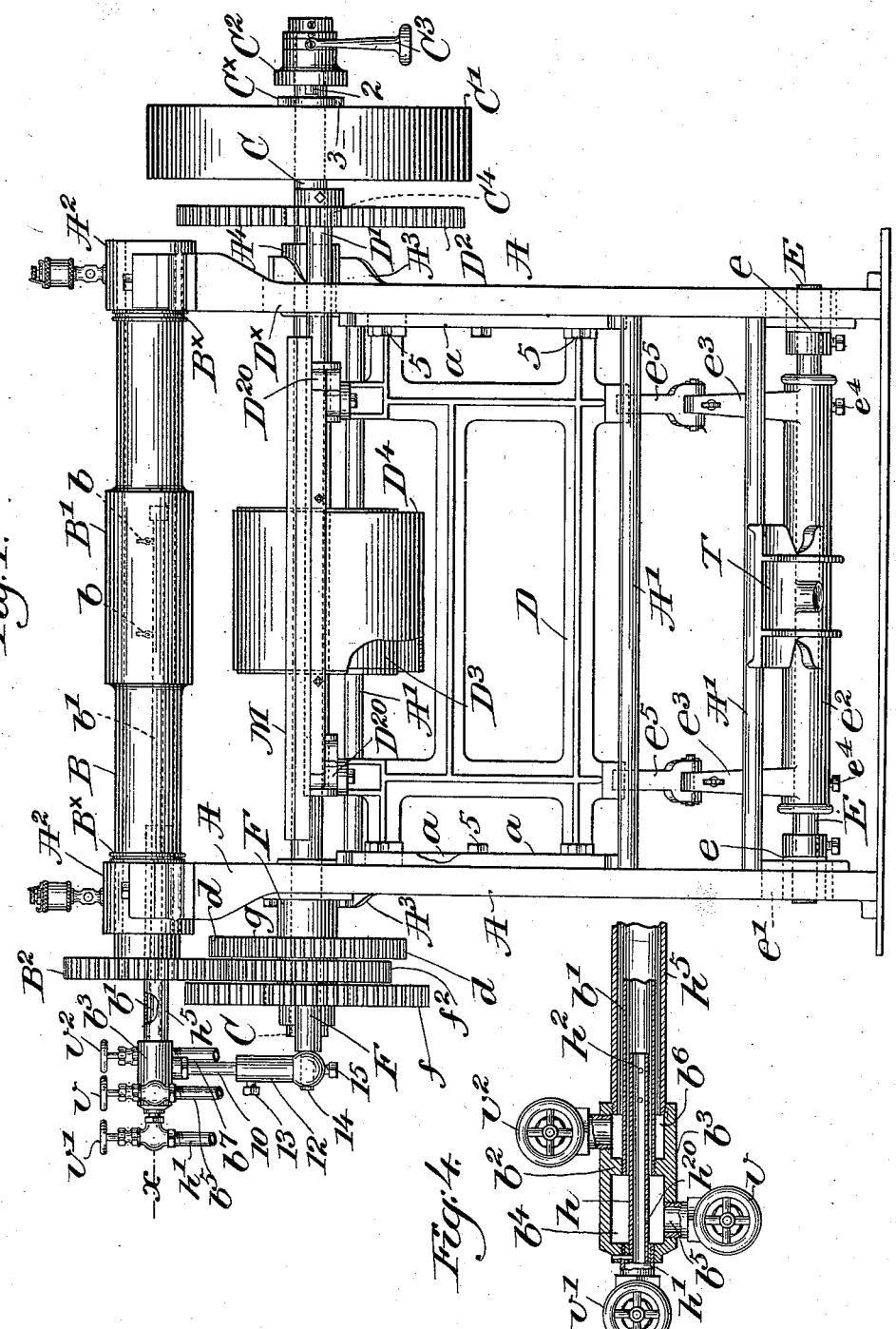
Witnesses.
Edward F. Allen.
Thomas F. Drummond.
Inventor:
William A. E. Henrici.
by Crosby Gregory.
Attys.

(No Model.) 2 Sheets—Sheet 2.
W. A. E. HENRICI.
BOSOM IRONING MACHINE.
No. 548,876. Patented Oct. 29, 1895.
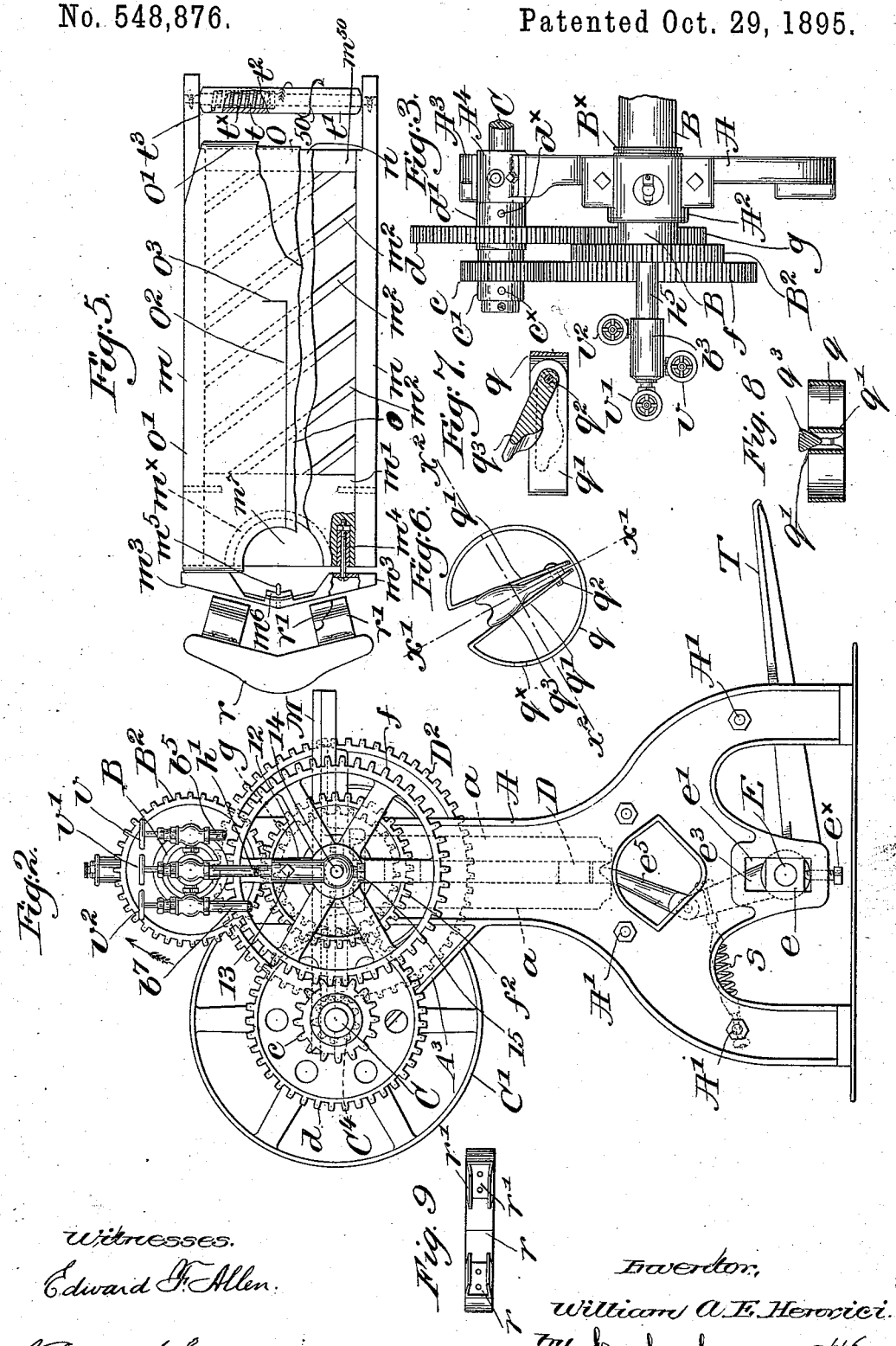
Witnesses.
Edward F. Allen.
Thomas J. Drummond.
Inventor,
William A. E. Henrici.
by Crosby Gregory, Attys.

UNITED STATES PATENT OFFICE.

WILLIAM A. E. HENRICI, OF CHELSEA, MASSACHUSETTS.

BOSOM-IRONING MACHINE.

SPECIFICATION forming part of Letters Patent No. 548,876, dated October 29, 1895.

Application filed March 12, 1895. Serial No. 541,470. (No model.)

*To all whom it may concern:*

Be it known that I, WILLIAM A. E. HENRICI, of Chelsea, county of Suffolk, State of Massachusetts, have invented an Improvement in Bosom-Ironing Machines, of which the following description, in connection with the accompanying drawings, is a specification, like letters and numerals on the drawings representing like parts.

This invention relates to machines for ironing shirt-bosoms, and has for its object the production of a machine of the class described whereby shirt-bosoms may be ironed smoothly and rapidly and with a most perfect finish, having a high-luster, medium, or lusterless finish, as desired.

A bosom-board is used in connection with the machine, to which board the shirt is secured in such manner as to stretch the bosom tightly thereover, the upper yielding or cushion-like surface of the board supporting the shirt-bosom as it is moved back and forth through the machine by the attendant.

In accordance therewith my invention consists in various details of construction and arrangement hereinafter fully described and particularly pointed out in the claims.

Figure 1 is a front elevation of a machine embodying my invention. Fig. 2 is a left-hand end elevation thereof. Fig. 3 is a top or plan view of the gearing shown at the left hand, Fig. 1. Fig. 4 is an enlarged sectional view of the gas and air mixer and controlling-valves on the line $x$, Fig. 1. Fig. 5 is a plan view, partially broken out, of the bosom board or support. Fig. 6 is an enlarged plan view of the neckband clamp. Fig. 7 is a section thereof, taken on the line $x'\ x'$, Fig. 6. Fig. 8 is a cross-sectional view of the neck-clamp, taken on line $x^2\ x^2$, Fig. 6; and Fig. 9 is an inner side elevation of the yoke-clamp.

The ironing-machine is herein shown as comprising side frames A A, of suitable shape to support the operative parts, and securely held together by cross-ties A', said frames having rigidly mounted thereon at their tops journal-boxes $A^2$ for the journals of a strong metal shaft B, shown as hollow and enlarged centrally at B', Fig. 1, to form the ironing cylinder or roll. Collars or flanges $B^\times$ on the shaft B adjacent the journal-boxes $A^2$ prevent longitudinal movement of the said shaft therein, one end of the shaft, herein shown as at the left-hand side, Fig. 1, projecting beyond its journal-box and having fast thereon a gear $B^2$. Brackets $A^3$ extend from the rear side of the frames, provided with bearings $A^4$ (see Fig. 3) for the main or driving shaft C, projecting at each end beyond the bearings, the said shaft having loose thereon at the right-hand end, Fig. 1, a belt-pulley C', its hub $C^\times$ forming one member of a clutch, the other member $C^2$ rotating with and being movable longitudinally on the shaft C by any suitable means, as a yoke $C^3$, to move a lug 2 on the member $C^2$ into or out of engagement with ears 3 on the member $C^\times$, to thereby rotate or stop the rotation of the shaft, the pulley C' being driven by a belt (not shown) connected with the source of power. Outside of the bearing $A^4$ at the other side of the machine a large gear $d$ and a small gear $c$ are mounted on the shaft C, their hubs $d'$ and $c'$, respectively, being adapted to be connected to and to rotate with the shaft one at a time by pins $d^\times$ and $c^\times$. (See Fig. 3.)

Plates $a$ are secured to the inner sides of the frames A, as by suitable bolts 5, to form vertical guideways for a reciprocable cross-head D. (Best shown in Fig. 1.)

A rock-shaft E is supported in bearings $e$, preferably mounted in slots $e'$ in the lower portions of the frames A and held in vertical adjustment by set-screws $e^\times$, while a sleeve $e^2$, having fast thereon arms $e^3$ and a treadle T, is rigidly secured to the rock-shaft by suitable set-screws $e^4$.

Short links $e^5$ pivotally connect the arms $e^3$ to the cross-head D, (see Figs. 1 and 2,) the ends of the links simply entering sockets in the cross-head, forming toggle-joints, depression of the treadle straightening the toggles and raising the cross-head, while suitable springs $s$ normally tend to break the joints when the treadle is released, one end of each spring being attached to an arm $e^3$ and the other end to one of the cross-ties A', Fig. 2.

The cross-head D is provided with bearings $D^{20}$ for an intermediate shaft D', extended through a slot $D^\times$ in one of the side frames, (shown as the right-hand one,) and having fast thereon a large gear $D^2$ in mesh with a small gear $C^4$, (see dotted lines, Figs. 1 and 2,) fast on the driving-shaft C, whereby rotation is transmitted to the intermediate shaft D'. This shaft D' is raised and lowered with the crosshead D, and it has fast upon it a cylindrical work-supporting roll D³ below the ironing-roll B', as clearly shown in Fig. 1, a loose shell D⁴, preferably of stout leather, surrounding the said roll D³. The vertical movement of the shaft D' is not sufficient to disengage the teeth of the gears D² and C⁴, so that the roll D³ may be continuously rotated, whether the crosshead is raised or lowered.

A stud F, rigidly secured to the outside of the left-hand frame A, Fig. 1, has loosely mounted thereon three gears $f$, $f^2$, and $g$, connected to rotate together, the smaller and larger gears $g$ and $f$ being in mesh, respectively, with the large gear $d$ and small gear $c$, mounted on the main shaft, the third gear $f^2$ engaging the gear B² of the ironing-roll shaft B.

If rotation of the main shaft C be transmitted by the gears $d$, $g$, and $f^2$ to the ironing-roll B', it will be rotated faster than if the rotation be transmitted through the gears $c$, $f$, and $f^2$, it being understood that the speed of the supporting-roll D² is constant, and when it is desired to give a so-called "domestic" finish to the shirt-bosoms the latter gearing will be used and the former if a gloss is to be put on. For a medium finish a set of gearing to rotate the roll at an intermediate speed would be employed. When one set of gearing is in use, the gear $c$ or $d$ of the other set will run loose on the main shaft C, its particular pin or connection $c^\times$ or $d^\times$ being removed.

The polished ironing-roll B' is heated from the interior by burners $b$, preferably upturned, as shown, (see dotted lines Fig. 1,) in a tube $b'$ extended into the hollow shaft B from one end, said tube being shown as secured at its outer end in the partition wall $b^2$ of a two-part chest $b^3$, the end of said tube opening into one of the parts, as $b^4$, constituting an air-chamber and having an air-inlet $b^5$, controlled by a suitable valve $v$. A tube $h$ within the tube $b'$ extends beyond its outer end through the air-chamber $b^4$, with which it communicates by a perforation $h^{20}$, the end of the tube connecting with a gas-inlet $h'$, controlled by a valve $v'$. As the gas passes through the tube $h$ air enters from the chamber $b^4$ and mixes with the gas in proper regulatable proportions, the mixture escaping at the open inner end of the tube $h$ and through perforations $h^2$ into the tube $b'$ in a thoroughly-mixed condition to pass to the burners $b$, the perforations assisting in the thorough incorporation of the gas with the air. The chamber $b^6$ is connected by a valve $v^2$ with a pipe $b^7$, leading from a source of fresh-air supply, whence air is forced into said chamber and out through a pipe $h^5$, surrounding the tube $b'$ and terminating some distance within the hollow shaft B, the fresh air thus forced thereinto supporting combustion of the mixed air and the gas at the burners $b$ within the roll.

Inasmuch as the shaft B is rotating when the machine is in operation, the chest $b^3$ and its rigidly-attached tubes and pipe are supported by a depending foot 10, telescopically entering a holder 12, and held therein by a set-screw 13, the holder being mounted on the reduced end 14 of the stud F and held adjusted by set-screw 15. By this connection and support the chest $b^3$ and its attached parts may be slightly adjusted vertically and also about the stud F as a center to bring the burners $b$ into proper position within the ironing-roll B'.

In ironing the shirt-bosom it is passed back and forth by the attendant between the ironing-roll B' and the work-supporting roll D³, and for this purpose the shirt is secured to a bosom-board now to be described.

Referring to Fig. 5, the bosom-board is shown as composed of sides $m$, rigidly connected at one end by a neck-piece $m'$ and at the other end by a cross-piece $m^{50}$ and strengthened by diagonal strips $m^2$, all preferably of wood, to form a compact rigid frame. A rubber sheet $n$ is secured to the top of the frame, the neck-piece $m$ being cut out at $m^\times$, either in the arc of a circle, as shown, or in an oval, according to the shape of the neck of the shirts with which it is to be used. Upon the rubber $n$ is laid a thick sheet $o$ of felt, and upon this a second cover-sheet of felt $o'$, both secured at the lower end of the board in suitable manner, and also around the neck-opening and at the sides of the said neck-opening $m^\times$ by a metal holder $m^3$, secured rigidly in place by bolts $m^4$ and fitting the board at the shoulder portions. The holder $m^3$ is cut away, as shown, to form the back of the neck-opening, and is provided with a pin $m^5$ and adjacent bearing-surface $m^4$ of felt, for a purpose to be described, a thin semicircular metal plate $m^7$ being let into the under side of the neck-piece $m'$ to prevent the clamp, to be described, from accidentally falling out. The top layer of felt $o$ is cut longitudinally at $o^2$ and transversely at $o^3$, to form a flap which may be raised to permit the insertion thereunder of the inner ply of the bosom of an open-front shirt, the upper ply thereof lying upon the flap when pushed back into place, the edge $o^2$ of the flap coinciding with the edge of the upper ply of the bosom.

In ironing open-bosom shirts, if the two plies of the bosom are overlaid one upon the other a ridge or mark will be made on the outer ply by the edge of the under ply, no matter how carefully ironed, and in the subsequent operation of bosom fixing the line or ridge cannot be obliterated. The formation of this ridge is herein obviated by making the flap in the outer cover $o'$ and inserting the under ply of the bosom beneath it, so that when pushed back into place the flap will lie smoothly and the edge of the top ply of the bosom will lie along the edge $o^2$ of the flap. In ironing, it will be obvious that the part of the under ply beneath the flap will not be ironed; but this is afterward done by a small iron in a bosom-fixing machine. When the bosom-board has been slipped into the shirt, the flap of the cover $o'$ is lifted and the under bosom-ply arranged as described and the flap replaced, and the neckband of the shirt is turned down in the neck-opening, the buttonhole at the back of the band being pushed over the pin $m^5$, and a clamp is inserted to hold the band firmly in place. This clamp is shown detached in Figs. 6 and 7 and herein consists in a piece of spring metal $q$, bent in a circular arc or in oval form, according to the shape of the neck-opening, the ends $q'$ being inturned and connected by a rivet $q^2$, which forms a pivot for a locking device $q^3$, mounted on the rivet $q^2$ between the ends $q'$ and wedge-shaped at its outer end to be forced down between said ends, as shown in dotted lines, Fig. 7, separating them and expanding the curved portions of the clamp. When the locking device is raised, as in Figs. 6 and 7, the clamp can be readily pushed down into the neck-opening inside of the neckband, and when the device $q^3$ is pressed down the clamp is expanded and tightly holds the neckband in place, the pin $m^5$ entering a notch $q^x$ in the clamp $q$. (Shown in Fig. 6 as extending downward from the upper edge of the clamp $q$.) The shoulders are held in place by a yoke-clamp $r$, having spring-clips $r'$ to fit over the ends of the holder $m^3$, one of the clips in Fig. 5 being shown with its upper member broken out in order that the other member may be seen below it.

The lower end of the shirt must be held firmly, and this is accomplished by securing a metal rod $t$ rigidly in the projecting portions of the sides $m$, Fig. 5, and mounting loosely on the rod a preferably wooden sleeve $t'$, polygonal in cross-section, interiorly recessed at $t^2$ to receive a coiled spring $t^x$, one end of which is secured at $t^3$ to the sleeve, the winding of the spring being such that the sleeve may be turned freely in the direction of the arrow 50, Fig. 5, the action thereby upon the spring being to partially unwind it or enlarge its coils, reverse movement of the sleeve, however, decreasing the size of the coils and tightening the spring $t^x$ on the rod $t$ and preventing such rotation. The lower end of the shirt is given a turn around the sleeve $t'$, and the latter is rotated in the direction of the arrow until the bosom is stretched tightly over the cover $o'$, and the spring $t^x$ locks the sleeve at any point in its rotation. The attendant now rests the board on the cover $D^4$ of the work-supporting roll $D^3$ and with his foot depresses the treadle T, raising the work-support until the heated ironing-roll B′ bears against the surface of the shirt-bosom and the latter is drawn between the rolls, the attendant regulating the pressure by means of the treadle. When the board has been pushed through far enough to allow the ironing-roll to act upon the whole bosom, the pressure is slightly relaxed and the board is pulled toward the attendant, the sleeve $D^4$ slipping over the roll $D^3$, and so preventing rubbing of the back of the shirt thereover. This operation is repeated as often as necessary to give the proper finish to the bosom, after which the clamp $q$ is unlocked and removed, the neckband drawn out, and the lower end of the shirt released from the sleeve $t'$, the yoke-clamp having been removed, and the bosom-board can be withdrawn at once from the shirt and inserted in another.

An assistant usually attaches and removes the shirt, so that the attendant can give his whole time to operating the machine.

A table M, cut away to admit the work-supporting roll $D^3$, is suitably attached to the cross-head D, keeping the sleeves of the shirt out of the way of the operating-shafts and adjacent parts, and the table also assists the operator in manipulating the board as it is run back and forth between the work supporting and ironing rolls.

Various modifications may be made in the details of the apparatus without departing from the spirit and scope of the invention.

I claim—

1. In a bosom ironing machine, a rotatable hollow ironing roll and a rotatable work-support, means to move one toward the other, a loose sleeve on said support, and an adjustably supported heating device for the ironing roll, combined with a main driving shaft, and connections between it and the ironing roll and work-support, to rotate them, substantially as described.

2. In a bosom ironing machine, a polished metallic ironing roll, a cylindrical work-support to co-operate therewith, a loose sleeve on said work support, and a board upon which the shirt to be ironed is tightly stretched, said board being moved back and forth between the ironing roll and work-support, retrograde movement of the board causing the loose sleeve to slip over the work-support without rubbing the back of the shirt, substantially as described.

3. A bosom board for ironing machines, consisting of a rigid frame having a cut away portion to receive the neck band of a shirt, a yielding cover for the upper side of said frame provided with a flap extending longitudinally from said cut away portion, to receive the under ply of the shirt bosom, a removable clamp to hold the neck band in place, and means to stretch and hold the lower end of the shirt, substantially as described.

4. A bosom board for ironing machines, consisting of a rigid frame, and a yielding cover for the upper side of said frame provided with a flap to receive the under ply of the shirt bosom, substantially as described.

5. A bosom board for ironing machines, consisting of a rigid frame, cut away at one end to receive the neck-band of the shirt, a correspondingly shaped expansible clamp to retain the neck-band in place, and a yielding cover for the frame, slitted to form a flap to cover the under ply of the bosom, the longitudinal edge of the flap coinciding with the edge of the upper bosom ply, substantially as described.

In testimony whereof I have signed my name to this specification in the presence of two subscribing witnesses.

WILLIAM A. E. HENRICI.

Witnesses:
JOHN C. EDWARDS,
AUGUSTA E. DEAN.